(12) United States Patent
Chavez et al.

(10) Patent No.: US 8,195,095 B2
(45) Date of Patent: Jun. 5, 2012

(54) MITIGATING AUDIBLE ACKNOWLEDGEMENT VOLUME IN A VEHICLE SECURITY SYSTEM

(75) Inventors: Timothy R. Chavez, Austin, TX (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 11/437,982

(22) Filed: May 19, 2006

(65) Prior Publication Data

US 2007/0269020 A1 Nov. 22, 2007

(51) Int. Cl.
*H04B 15/00* (2006.01)

(52) U.S. Cl. .... 455/63.1; 370/310; 455/501; 455/67.13; 455/570; 455/283; 455/344

(58) Field of Classification Search .......... 370/310–350; 455/641, 25, 501, 63.1, 67.13, 550.1, 569.1, 455/569.2, 570, 254, 278.1, 283, 296, 344, 455/345, 355, 461, 15–16
See application file for complete search history.

(56) References Cited

U.S. PATENT DOCUMENTS

| | | | | |
|---|---|---|---|---|
| 5,007,046 A * | 4/1991 | Erving et al. | 370/249 |
| 5,170,499 A * | 12/1992 | Grothause | 455/238.1 |
| 5,550,922 A * | 8/1996 | Becker | 381/57 |
| 5,822,402 A * | 10/1998 | Marszalek | 379/88.21 |
| 5,842,139 A * | 11/1998 | Muramatsu et al. | 455/563 |
| 6,233,462 B1 * | 5/2001 | Kanai | 455/567 |
| 6,269,257 B1 * | 7/2001 | Cannon et al. | 455/567 |
| 6,744,882 B1 * | 6/2004 | Gupta et al. | 379/387.01 |
| 6,766,176 B1 * | 7/2004 | Gupta et al. | 455/550.1 |
| 6,944,474 B2 * | 9/2005 | Rader et al. | 455/550.1 |
| 7,023,984 B1 * | 4/2006 | Short et al. | 379/388.03 |
| 7,024,229 B2 * | 4/2006 | Nishimura | 455/567 |
| 7,079,645 B1 * | 7/2006 | Short et al. | 379/388.03 |
| 7,392,066 B2 * | 6/2008 | Haparnas | 455/567 |
| 7,457,644 B1 * | 11/2008 | Bobisuthi et al. | 455/570 |
| 7,589,631 B2 * | 9/2009 | Hovmalm et al. | 340/566 |
| 7,835,773 B2 * | 11/2010 | Angelopoulos | 455/570 |
| 2003/0002688 A1 * | 1/2003 | Kanevsky et al. | 381/74 |
| 2003/0013495 A1 * | 1/2003 | Oleksy | 455/567 |
| 2004/0091123 A1 * | 5/2004 | Stark et al. | 381/86 |
| 2006/0023442 A1 | 2/2006 | De Los Santos et al. | |
| 2008/0281220 A1 * | 11/2008 | Sharifpour | 600/538 |

* cited by examiner

*Primary Examiner* — Hemant Patel

(74) *Attorney, Agent, or Firm* — Yudell Isidore Ng Russell PLLC

(57) ABSTRACT

A system, method, and computer-usable medium for mitigating audible acknowledgement volume in a vehicle security system. A preferred embodiment of the present invention includes measuring an amplitude of a valid signal, in response to receiving the valid signal; in response to determining the amplitude of the valid signal, comparing the amplitude to a first predetermined threshold; in response to the comparison, adjusting a volume setting of an audible acknowledgement; further adjusting the volume setting in response to measuring ambient noise of a surrounding location; and emitting the audible acknowledgement.

9 Claims, 3 Drawing Sheets

MITIGATING AUDIBLE ACKNOWLEDGEMENT VOLUME IN A VEHICLE SECURITY SYSTEM

BACKGROUND OF THE INVENTION

1. Technical Field

The present invention relates in general to the field of security systems. More specifically, the present invention relates to a system and method for mitigating audible acknowledgement volume in a vehicle security system.

2. Description of the Related Art

Remotely locking or securing a vehicle (e.g., enabling the vehicle's alarm system) utilizing a key fob or remote control may produce an audible acknowledgement (e.g., a short honk from the horn) by the vehicle indicating a successful operation has occurred. As well-known to those with skill in the art, the volume of the audible emission is static and set such that it can penetrate a noisy environment and be heard from a distance. However, in some instances (e.g., at night, near a residential area, etc.) the volume of the audible acknowledgement may be a nuisance to the surrounding environment. Therefore, there is a need for a system and method for addressing the aforementioned limitation of the prior art.

SUMMARY OF THE INVENTION

The present invention includes a system, method, and computer-usable medium for mitigating audible acknowledgement volume in a vehicle security system. A preferred embodiment of the present invention includes measuring an amplitude of a value signal, in response to receiving the valid signal; in response to determining the amplitude of the valid signal, comparing the amplitude to a first predetermined threshold; in response to the comparison, adjusting a volume setting of an audible acknowledgement; further adjusting the volume setting in response to measuring ambient noise of a surrounding location; and emitting the audible acknowledgement.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1A:
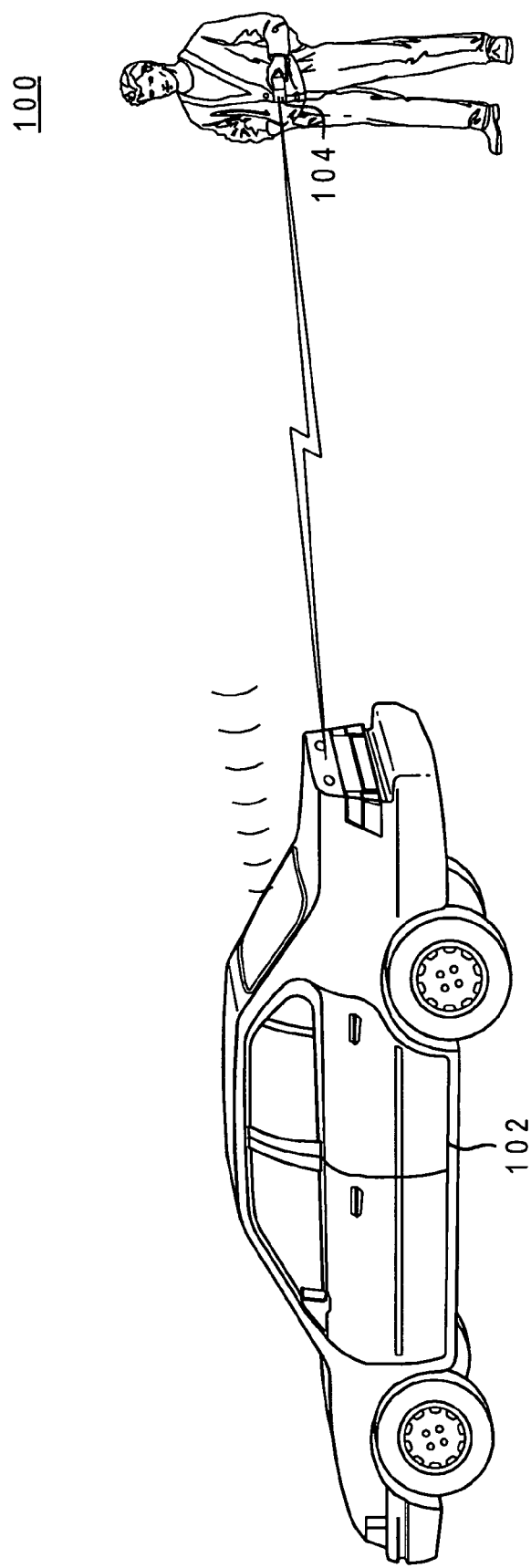
FIG. 1A is a pictorial representation of an exemplary automobile security system in which a preferred embodiment of the present invention may be implemented.

Referring now to the figures, and more particularly, referring to FIG. 1A, there is illustrated a pictorial representation of an exemplary vehicle security system 100 according to a preferred embodiment of the present invention. As illustrated, vehicle security system 100 includes a vehicle 102 and a remote control 104. Vehicle 102 incorporates receiver assembly 120, while remote control 104 is implemented by transmitter assembly 121, both discussed in more detail in conjunction with FIG. 1B.

Figure 1B:
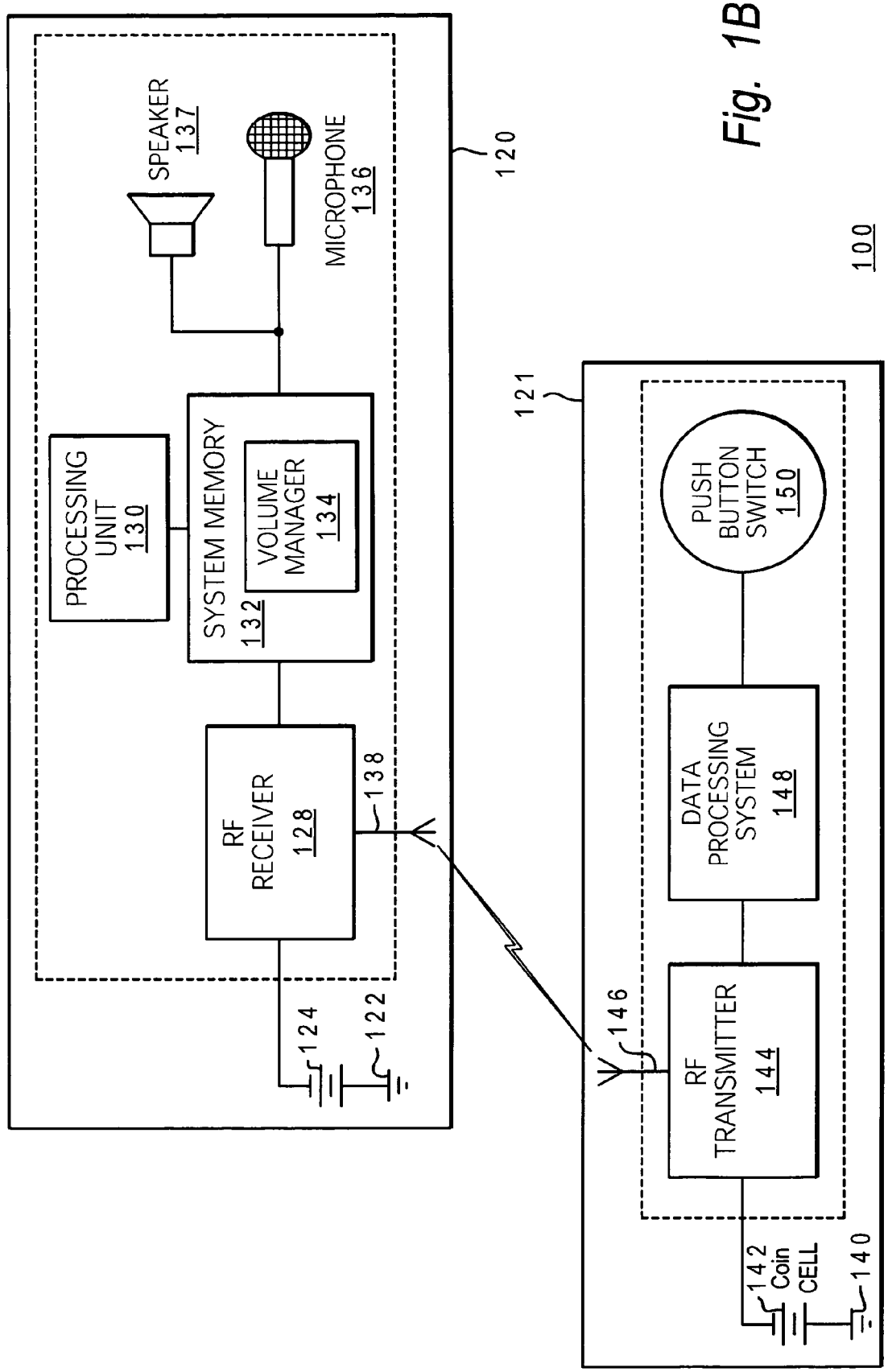
FIG. 1B is a block diagram of an exemplary automobile security system in which a preferred embodiment of the present invention may be implemented.

FIG. 1B is a block diagram illustrating an exemplary vehicle security system 100 in which a preferred embodiment of the present invention may be implemented. As depicted, vehicle security system 100 includes a receiver assembly 120 and a transmitter assembly 121 that communicate wirelessly via antennae 138 and 146. Receiver assembly 120 includes ground 122, power supply 124, antenna 138, RF receiver 128, processing unit 130, system memory 132, microphone 136, and speaker 137.

Figure 2:
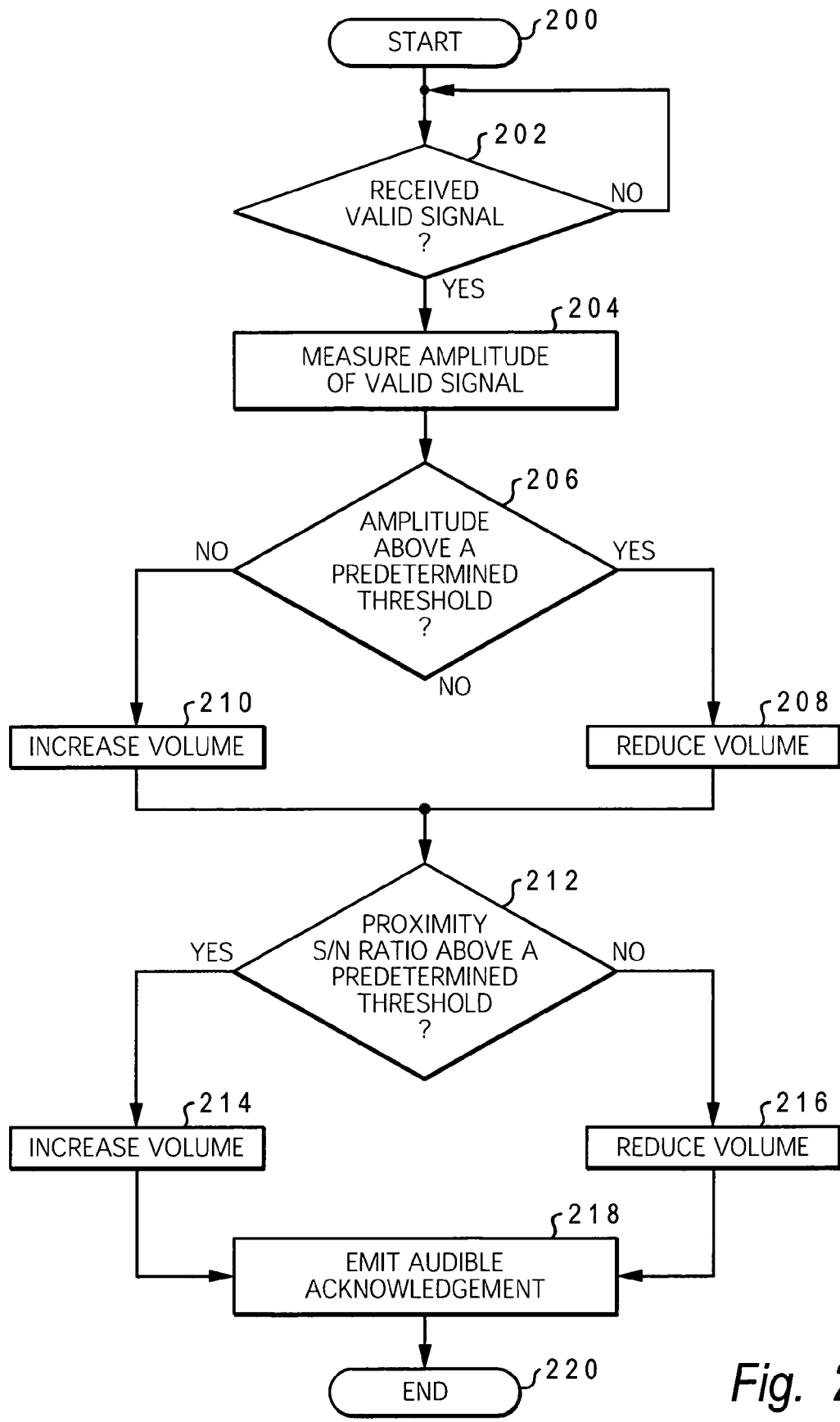
FIG. 2 is a high-level logical flowchart diagram illustrating an exemplary method for mitigating audible acknowledgement volume in a vehicle security system according to a preferred embodiment of the present invention.

System memory 132 includes volume manager 134 for controlling audible acknowledgement volume, as discussed herein in more detail in conjunction with FIG. 2. RF receiver 128 sends data to volume manager 134 after receiving a valid signal from transmitter assembly 121. Microphone 136 measures the signal/noise ration of the surrounding environment and sends data to volume manager 134.

Still referring to FIG. 1B, transmitter assembly 121 includes ground 140, coin cell (power supply) 142, RF transmitter 144, antenna 146, data processing system 148, and push button switches 150. When a user presses push button switches 150, data processing system 148 determines which button was pressed and sends out the corresponding signal. For example, transmitter assembly 121 may transmit different signals for different functions. A first signal may open a trunk door, a second may unlock the doors, while a third may lock the doors.

FIG. 2 is a high-level logical flowchart diagram depicting an exemplary method for mitigating audible acknowledgement volume in a vehicle security system according to a preferred embodiment of the present invention. The process begins at step 200 and proceeds to step 202, which illustrates volume manager 134 determining if RF receiver 128 has received a valid signal from transmitter assembly 121. If a valid signal has not been received, the process iterates at step 202. If, however, a valid signal has been received, RF receiver 128 measures the amplitude of the signal emitted from transmitter assembly 121. If the amplitude of the signal exceeds a predetermined threshold (step 206), volume manager 134 reduces the volume setting of the audible acknowledgement, as illustrated in step 208. If the amplitude of the signal emitted from transmitter assembly 121 does not exceed a predetermined threshold, the volume setting of the audible acknowledgement will be increased, as depicted in step 210.

The process proceeds to step 212, which illustrates volume manager 134 calculating the proximity signal-to-noise ratio of the surround environment by measuring the ambient noise of the environment via microphone 136. If surrounding area is a noisy area, such that the computed signal-to-noise ratio is above a predetermined threshold, the volume setting for the audible acknowledgement is increased (step 214). Conversely, the surround area is a quiet area (e.g., nighttime or residential area) such that the computed signal-to-noise ratio is below a predetermined threshold, the volume setting of the audible acknowledgement is decreased (step 216). The process continues to step 218, which illustrates volume manager 134 emitting the audible acknowledgement with the calculated volume setting via speaker 137. Finally, the process ends, as illustrated in step 220.

As discussed, the present invention includes a system, method, and computer-usable medium for mitigating audible acknowledgement volume in a vehicle security system. A preferred embodiment of the present invention includes measuring an amplitude of a value signal, in response to receiving the valid signal; in response to determining the amplitude of the valid signal, comparing the amplitude to a first predetermined threshold; in response to the comparison, adjusting a volume setting of an audible acknowledgement; further adjusting the volume setting in response to measuring ambient noise of a surrounding location; and emitting the audible acknowledgement.

It should be understood that at least some aspects of the present invention may alternatively be implemented in a computer-usable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD-Rom, optical media), system memory such as, but not limited to Random Access memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system include, but not limited to, personal computers, servers, workstations, network computers, main frame computers, routers, switches, personal data assistants (PDAs), telephones, and any other system capable of processing, transmitting, receiving, capturing, and/or storing data.

What is claimed is:

1. In a data processing system, a computer-implementable method comprising:
   a radio frequency (RF) receiver of a receiver assembly receiving a valid signal emitted by a RF transmitter, wherein said valid signal corresponds to a selected function;
   in response to receiving said valid signal, measuring an amplitude of said valid signal;
   in response to determining said amplitude of said valid signal, comparing said amplitude of said valid signal to a first predetermined threshold;
   in response to said comparison, performing a first adjustment of a volume setting of an audible acknowledgement, according to said comparison;
   measuring, via a microphone at said RF receiver, an ambient noise of a surrounding location;
   calculating a signal-to-noise ratio of said surrounding location from said ambient noise measurement and said amplitude of said valid signal;
   comparing said signal-to-noise ratio of said surrounding location with a second predetermined threshold;
   performing a second adjustment of said volume setting in response to comparing said signal-to-noise ratio of said surrounding location with said second predetermined threshold; and
   emitting an adjusted audible acknowledgement via a speaker of the receiver assembly based on the first and second adjustments of said volume setting of said audible acknowledgement.

2. The computer-implementable method according to claim 1, wherein said performing said first adjustment further includes:
   reducing said volume setting in response to determining said amplitude meets or exceeds said first predetermined threshold; and
   increasing said volume setting in response to determining said amplitude does not meet or exceed said first predetermined threshold.

3. The computer-implementable method according to claim 1, wherein said performing said second adjustment further includes:
   increasing said volume setting in response to determining said signal-to-noise ratio of said surrounding location meets or exceeds a second predetermined threshold; and
   reducing said volume setting in response to determining said signal-to-noise ratio of said surrounding location is below the second predetermined threshold.

4. A system comprising:
   a processor;
   a radio frequency (RF) receiver;
   a computer-usable medium embodying computer program code, said computer usable medium being embodied in hardware and coupled to said processor, said computer program code comprising instructions executable by said processor and configured to cause the system to:
   receive a valid signal emitted by a RF transmitter, wherein said valid signal corresponds to a selected function;
   in response to receiving said valid signal, measure an amplitude of said valid signal;
   in response to determining said amplitude of said valid signal, compare said amplitude of said valid signal to a first predetermined threshold;
   in response to said comparison, perform a first adjustment of a volume setting of an audible acknowledgement, according to said comparison;
   measure, via a microphone at said RF receiver, an ambient noise of a surrounding location;
   calculate a signal-to-noise ratio of said surrounding location from said ambient noise measurement and said amplitude of said valid signal;
   compare said signal-to-noise ratio of said surrounding location with a second predetermined threshold;
   perform a second adjustment of said volume setting in response to comparing said signal-to-noise ratio of said surrounding location with said second predetermined threshold; and
   emit an adjusted audible acknowledgement via a speaker of the receiver assembly based on the first and second adjustments of said volume setting of said audible acknowledgement.

5. The system according to claim 4, wherein said instructions that causes the system to perform said first adjustment are further configured for causing to cause the system to:
   reduce said volume setting in response to determining said amplitude meets or exceeds said first predetermined threshold; and increase said volume setting in response to determining said amplitude does not meet or exceed said first predetermined threshold.

6. The system according to claim 4, wherein said instructions are further configured to cause the system to:
increase said volume setting in response to determining said signal-to-noise ratio of said surrounding location meets or exceeds a second predetermined threshold; and
decrease said volume setting in response to determining said signal-to-noise ratio of said surrounding location is below the second predetermined threshold.

7. A non-transitory computer-usable storage medium embodying computer program code, said computer program code comprising computer-executable instructions configured for causing a computer system to perform functions comprising:
receiving a valid signal emitted by a RF transmitter, wherein said valid signal corresponds to a selected function;
in response to receiving said valid signal, measuring an amplitude of said valid signal;
in response to determining said amplitude of said valid signal, comparing said amplitude of said valid signal to a first predetermined threshold;
in response to said comparison, performing a first adjustment of a volume setting of an audible acknowledgement, according to said comparison;
measuring, via a microphone at said RF receiver, an ambient noise of a surrounding location;
calculating a signal-to-noise ratio of said surrounding location from said ambient noise measurement and said amplitude of said valid signal;
comparing said signal-to-noise ratio of said surrounding location with a second predetermined threshold;
performing a second adjustment of said volume setting in response to comparing said signal-to-noise ratio of said surrounding location with said second predetermined threshold; and
emitting an adjusted audible acknowledgement via a speaker of the receiver assembly based on the first and second adjustments of said volume setting of said audible acknowledgement.

8. The computer-usable storage medium according to claim 7, wherein said computer-executable instructions for performing said first adjustment are further configured for:
reducing said volume setting in response to determining said amplitude meets or exceeds said first predetermined threshold; and
increasing said volume setting in response to determining said amplitude does not meet or exceed said first predetermined threshold.

9. The computer-usable storage medium according to claim 7, wherein said computer-executable instructions for performing said second adjustment are further configured for:
increasing said volume setting in response to determining said signal-to-noise ratio of said surrounding location meets or exceeds a second predetermined threshold; and
reducing said volume setting in response to determining said signal-to-noise ratio of said surrounding location does not meet or exceed a second predetermined threshold.

* * * * *